April 13, 1954  H. L. STILES  2,675,458
ELECTRIC COOKING UTENSIL
Filed June 24, 1950  2 Sheets-Sheet 1
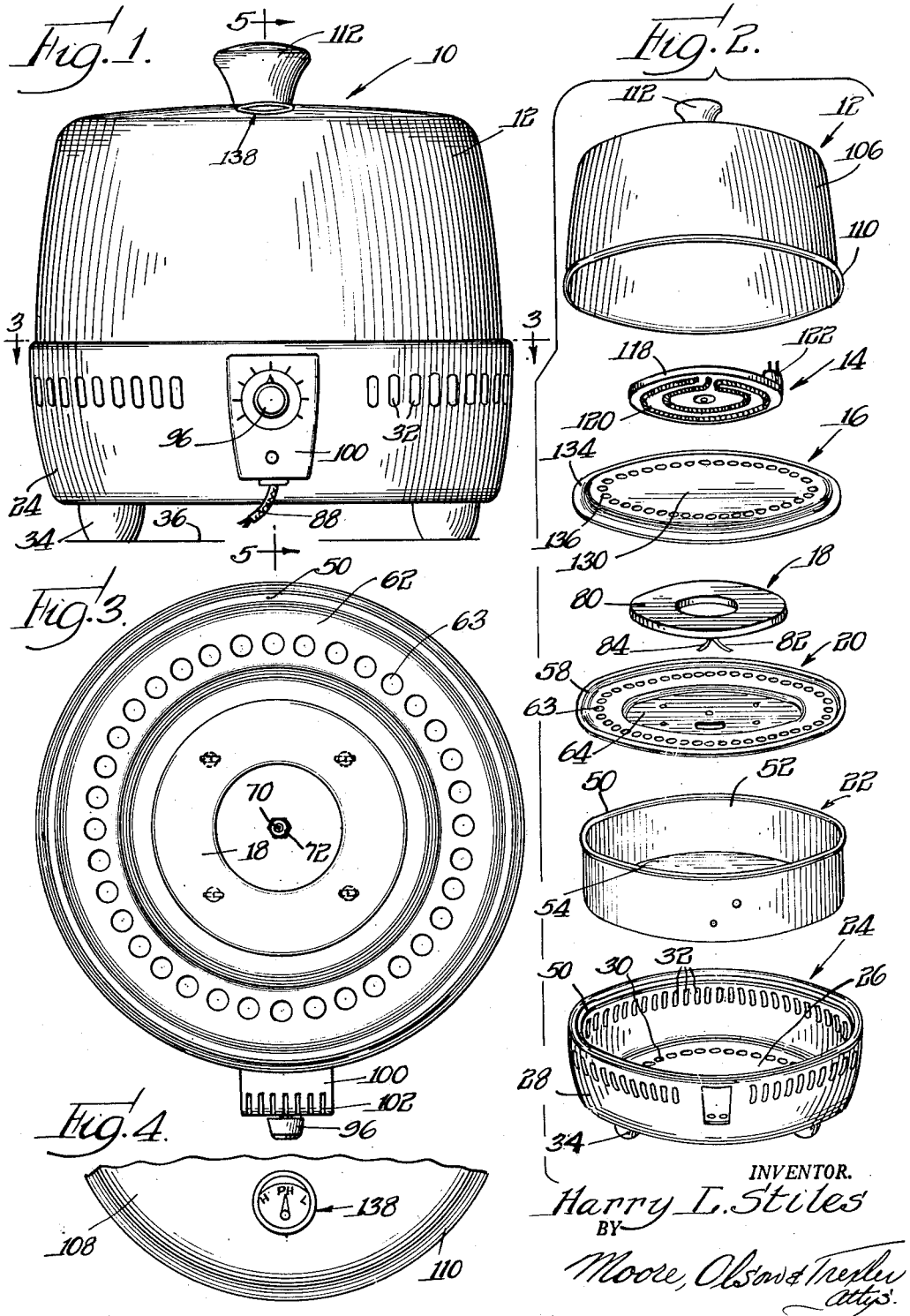
INVENTOR.
Harry L. Stiles
BY
Moore, Olson & Trexler
attys.

April 13, 1954 H. L. STILES 2,675,458
ELECTRIC COOKING UTENSIL
Filed June 24, 1950 2 Sheets-Sheet 2
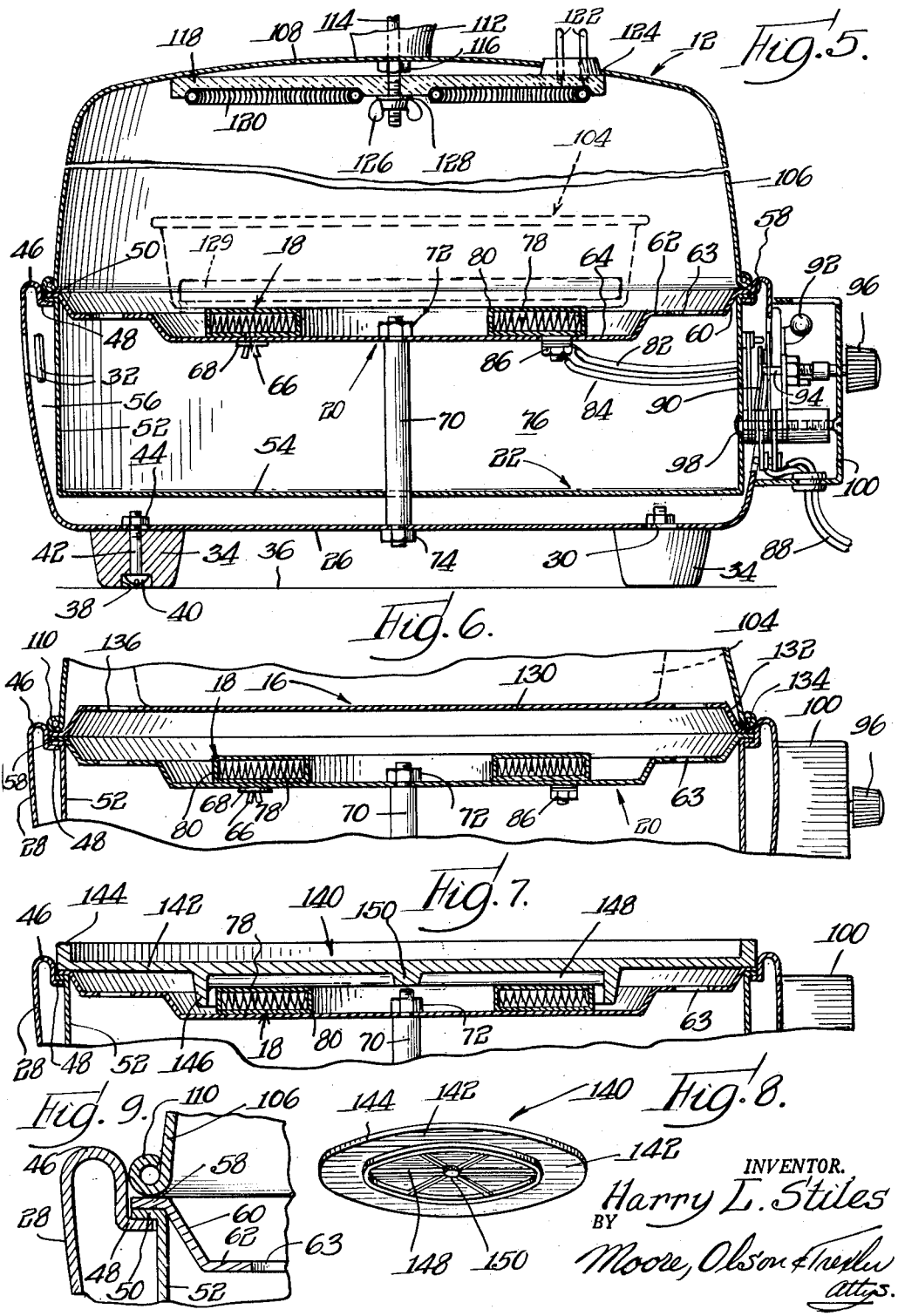
INVENTOR.
Harry L. Stiles
BY
Moore, Olson & Trexler
attys.

Patented Apr. 13, 1954

2,675,458

UNITED STATES PATENT OFFICE 2,675,458

ELECTRIC COOKING UTENSIL

Harry L. Stiles, Bridgeport, Conn.

Application June 24, 1950, Serial No. 170,228

7 Claims. (Cl. 219—35)

This invention relates to cooking appliances and more particularly to self contained portable cooking appliances.

It is an important object of the present invention to provide an improved cooking appliance which is adapted for use in various types of cooking operations; more specifically it is an object of the present invention to provide a cooking appliance of the type set forth having heating elements which form a part of the appliance, certain of the elements being removable or inoperative during certain types of heating operations.

Another object of the invention is to provide in a cooking utensil of the type described an improved mounting for the heating elements and improved supports for the cooking utensils to be used in cooperation with the heating elements.

Yet another object of the invention is to provide in a cooking appliance of the type described an improved mounting for a thermostat control whereby the control gives different types of desired responses depending upon the type of cooking to be performed.

Still another object of the invention is to provide in a cooking appliance of the type set forth an improved base structure wherein means is provided for maintaining the base structure and particularly that portion of the base structure which rests upon the supporting surface at a relatively low temperature whereby to prevent the supporting surface from being marred and to prevent the user's body from being burned by coming in contact therewith.

A further object of the invention is to provide a cooking appliance of the type described which is more economical to fabricate and operate and which is readily converted for use in various types of cooking operations.

These and other objects and advantages of the invention will be better understood when taken in connection with the following description and the accompanying drawings.

In the drawings wherein like reference numerals have been used to designate like parts throughout:

Figure 1 is a side elevational view of a cooking appliance made in accordance with and embodying the principles of the present invention with the dome positioned thereon;

Figure 2 is an exploded view showing certain of the parts of the cooking appliance which form the subject matter of the present invention in perspective;

Figure 3 is a cross sectional view of the cooking appliance shown in Figure 1 substantially as seen in the direction of the arrows along the line 3—3 of Figure 1;

Figure 4 is a partial plan view of the dome forming part of the present invention showing a temperature indicating device mounted thereon in the aperture formed by the removal of one of the heating elements;

Figure 5 is an enlarged cross sectional view of the cooking appliance shown in Figure 1 substantially as seen in the directions of the arrows along the line 5—5 of Figure 1, the appliance being shown in condition for broiling;

Figure 6 is a partial cross sectional view similar to Figure 5 showing the lower heating element and the heating spreader plate used in roasting and baking in the operative position;

Figure 7 is a view similar to Figure 6 showing a grill in position over the lower heating element to be used in direct grilling and frying applications;

Figure 8 is a perspective view reduced in size showing the underside of the grill illustrated in Figure 7; and Figure 9 is a further enlarged view in vertical cross section of the juncture of the base, the lower heating support, and the dome.

Referring now to the drawings and more particularly to Figures 1 and 2 thereof, there is shown a cooking appliance, generally designated by the numeral 10, made in accordance with and embodying the principles of the present invention. The appliance 10 comprises generally a cover or dome 12, a removable upper heating element 14, a heater spreading plate 16, a lower heating element 18, a heating element support plate 20, an inner lining 22, and an external housing 24.

The heating element support plate 20, the inner lining 22, and the external housing 24 are assembled to form a doubled wall base which serves as a support for the lower heating element 18, the dome 12, and the other associated parts to be described hereinafter.

As is best shown in Figures 2, 3, and 5, the external housing 24 is generally cylindrical in shape and includes a circular bottom 26 and an upstanding circumferentially extending wall 28. A plurality of apertures 30 are formed in the bottom 26 and are arranged in a circle near the outer periphery of bottom 26. Another series of apertures 32 is formed in the circumferentially extending wall 28 of housing 24 adjacent the upper edge thereof. Apertures 32 cooperate with the apertures 30 in a manner and for a purpose to be described more fully hereinafter. A plurality of depending legs 34 are provided to space the bottom 26 of housing 24 away from the supporting surface 36. A recess 38 is formed on the lower side of legs 34 and receives the head 40 of a threaded bolt 42 which extends through one of the apertures 30 in bottom 26. Bolt 42 receives on the threaded end thereof a nut 44 whereby to fasten leg 34 to the bottom of housing 24. The legs 34 are preferably formed of materials which do not conduct heat or which are generally referred to as heat insulating materials. Suitable examples of such material are wood, fiber, and plastics. By forming the legs 34 of a non-conducting material, any finish on the supporting surface 36 is protected from the deleterious action of heat when the appliance 10 is being used.

The upper edge of wall 28 has formed thereon an inwardly extending curved flange 46 which terminates in an inwardly extending lip 48. Lip 48 is adapted to receive and support a laterally and outwardly extending flange 50 formed on the upper edge of a circumferentially extending wall 52 of inner lining 22. As may be best seen in Figures 2 and 3 the wall 52 is substantially circular and is provided at the end thereof disposed opposite flange 50 with a circular bottom 54. The diameter of inner lining 22 is slightly less than the diameter of housing 24 whereby to provide an annular chamber 56 disposed between the outer side of the bottom and wall of inner lining 22 and the inner side of the bottom and wall of housing 24.

The upper side of flange 50 serves as a support for a laterally extending flange 58 formed on the upper edge of the peripheral wall 60 of the heating element support plate 20. The wall 60 is substantially circular and surrounds the body 62 of the support plate 20. A plurality of apertures 63 are formed adjacent the periphery of body 62 and serve a purpose to be more fully described hereinafter. Body 62 is recessed in the center thereof to provide a heating element accommodating support 64 which is substantially circular in shape. The lower heating element 18 is positioned concentrically on support 64 and is attached thereto by means of a plurality of sets of tines 66 which project through apertures in support 64. A washer 68 receives the tines 66 on the underside of support 64 and the tines are spread apart and bent over washer 68 thereby to fasten the lower heating element 18 to support 64.

The heating element support plate 20, the inner lining 22 and the external housing 24 are held in assembled relationship as may be best seen in Figure 5. Aligned apertures are formed in the center of each of the above members to receive therethrough a bolt 70 having threaded portions formed on either end thereof which extend through the apertures in the support plate 20 and the housing 24. A nut 72 engages the thread of bolt 70 adjacent support plate 20 and a nut 74 similarly engages the threaded portion of bolt 70 adjacent the housing 24. Bolt 70 in cooperation with nuts 72 and 74 holds the support plate 20, the inner lining 22, and the housing 24 in assembled position to form a base. As has been explained above the inner lining 22 and the housing 24 cooperate to form a chamber 56 therebetween. Support plate 20 and inner lining 22 similarly cooperate to form a chamber 76 which serves the important features described hereinafter.

Heating element 18 is of the usual type and includes a resistive element 78 which is encased in a heat conducting cover 80. As may be best seen in Figure 5, heating element 18 is substantially rectangular in vertical cross section and has a height slightly greater than the distance between the support surface 64 and the plane of body 62 whereby the upper surface of heating element 18 is disposed a short distance above the plane of body 62. In plan view heating element 18 is circular with an aperture formed in the center thereof.

The heating element 18 is of the electrical resistive type and is supplied with potential and heating current through lines 82 and 84 which are attached to suitable connections 86 formed on the lower side of heating element 18 and which extend through the support surface 64. Heating current is supplied to lines 82—84 from a power line designated by the numeral 88 through a thermostat unit of the usual type including a temperature responsive element 90, an indicating light 92 and a structure for setting the thermostat device comprising a movable rod 94 and an actuating knob 96. The thermostat is of the type which is normally closed at low temperatures, that is, the temperature responsive element 90 is in position to complete the circuit from power line 88 through the heating coil 18 at low temperatures, and the circuit is interrupted or opened at high temperatures. When current is flowing through the heating element 18 the light 92 is lit. The temperature at which the thermostat opens can be adjusted by turning knob 96 thereby to move the temperature responsive element 90 to the open position at a lower temperature.

The temperature responsive element 90 and associated parts are mounted directly on the inner lining 22 by means of a screw 98. Direct thermal contact between element 90 and inner lining 22 is thereby maintained through screw 98. This construction insures that the thermostat is responsive to any and all variations of the temperature of inner lining 22. All of the parts of the thermostat with exception of knob 96 are enclosed within a housing 100 attached to one side of housing 24. As may be best seen in Figure 3 a plurality of apertures 102 are formed in the upper side of housing 100 in such a position that the light radiating from light bulb 92 is visible therethrough.

With the above structure in mind, one important use of the present invention can now be described. Cooking operations involving boiling, stewing, pan frying, and deep fat frying can be accomplished with the above described structure by simply placing a cooking utensil such as the pan 104 shown in dot and dash lines directly on the heating element 18 as shown in Figure 5. Power is applied through line 88 and since the inner lining 22 is cool at the beginning of the cooking period, the thermostat will be closed and heating current will be applied to coil 18. It is desirable in the cooking operations set forth above to have the maximum heat applied for a long length of time in order to bring the heating medium such as water or grease to the required cooking temperature. This is achieved since the apertures 63 in support plate 20 allow adequate circulation whereby to keep the inner lining 22 cold. Since the temperature responsive element 90 is directly connected through screw 98 to inner lining 22 the thermostat will be maintained in the operative or heating position so long as inner lining 22 is held relatively cold. After a certain period of heating inner lining 22 will reach such a temperature that the thermostat will open, thus deenergizing heating coil 18. Thereafter the thermostat will alternately close and open in such a manner as to keep the cooking appliance at the required cooking temperature as determined by the setting of knob 96.

An important feature of the invention resides in the fact that a continuous circulation of air is provided through chamber 56 due to the presence of the two sets of apertures, namely, apertures 30 and 32 formed in the bottom 26 and the side wall 28 respectively of housing 24. This continuous circulation of air serves to aid in the operation of the thermostat by providing a manner for ultimately cooling inner lining 22 in case the heating element 18 should overheat. This circulation of air through chamber 56 also serves to maintain the external housing 24 at a relatively low temperature. This latter function serves to aid in protecting the supporting surface 36 from the deleterious action of heat and also protects the user of the appliance from burns in the event that the user accidently contacts the outer wall of external housing 24.

Referring again to Figure 5 there is shown a cross section of the dome or cover 12 which forms a part of the present invention. Dome 12 includes a slightly inclined and circularly extending side wall 106 which is formed integral with a curved top 108. The lower edge of wall 106 is circular and is provided with a lower flange 110 which is adapted to rest upon flange 58 of support plate 20 and to be confined by the flange 46 formed on the upper edge of housing 24. A handle 112 is affixed to the center of dome 12 by means of a bolt 114 cooperating with a nut 116. The handle 112 is preferably formed of a non-conducting material or heat insulating material such as wood, fiber, or plastic. The height of the side walls 106 of dome 12 is such as to accommodate various utensils which are used in baking, roasting, and broiling.

There are shown in Figure 5 the various parts of the present invention assembled for use in broiling. During broiling the upper removable heating element 14 is attached to dome 12 in the position shown. The upper heating element 14 includes a base 118 upon which is disposed a length of exposed electrical resistance wire 120. Electrical potential is applied to the resistance wire 120 through a connection 122 which extends through an aperture 124 in dome 12. The heating element 14 is attached to dome 12 by means of the bolt 114 which holds handle 112 on the dome. Bolt 114 extends through an aperture in base 118 and in cooperation with wing nut 126 serves to hold the heating element 14 in the position shown. A washer 128 is preferably disposed between base 118 and wing nut 126.

The material to be broiled is placed upon a grate such as the grate 129 shown in dotted lines in Figure 5. Grate 129 is placed within a pan such as pan 104, which serves to catch the juices and grease which fall from the material being broiled. Heating current is applied through connection 22 to the upper heating element 14, but preferably no heat is applied from the lower heating element 18 while broiling, as will be understood by those skilled in the art. The heat from the open coil 120 will be directed upon the material being broiled whereby to accomplish this cooking operation. The thermostat is inoperative during broiling if the lower heating unit 18 is not used.

Referring now to Figure 6 the manner in which roasting and baking are accomplished using the present invention will be described. In these operations the heat spreader plate 16 is disposed over the heating element 18 whereby to remove the bottom of the pan 104 away from the surface of the heating element 18. Spreader plate 16 includes a body 130 which is generally circular and from which depends a side 132. Formed on the lower edge of side 132 is a laterally and outwardly extending flange 134 which rests upon flange 58 of the support plate 20 and within flange 46 on the upper edge of housing 24. A plurality of apertures 136 are formed in body 130 and are disposed in a circle near the periphery thereof. During roasting and baking the upper heating element 14 is preferably removed and the dome 12 is positioned with its flange 110 on top of flange 134 of spreader plate 16. The removal of heating element 14 leaves aperture 124 in dome 12 open. Aperture 124, therefore, during baking and roasting, receives a temperature indicating device 138 as may be best seen in Figure 4 of the drawing. Device 138 serves to indicate the approximate temperature within the dome 12.

During roasting and baking a circulation of air is obtained from chamber 76 up through apertures 63 in support plate 20 and apertures 136 in spreader plate 16 into dome 12 and back again. This circulation occurs whenever differentials in temperature occur within the spaces. Such circulation tends to keep all portions in contact therewith at substantially the same temperature whereby to obtain even and uniform baking and roasting. Due to this circulation the thermostat unit is effective to control the temperature in the upper chamber although the temperature responsive element 90 is directly connected to one of the walls of the lower chamber. The temperatures in the upper and lower chambers will be very nearly the same and in any event will be proportional to each other. Accordingly, the thermostat unit can in effect control the temperature in the upper chamber.

It is to be noted that circulation is obtained between the heating element 18 and the body 130 of spreader plate 16 whereby to prevent overheating of the bottom of utensil 104. Heat is conserved during roasting and baking operations due to the fact that the inner surface of dome 12 is heat reflective and therefore tends to return radiated heat to the inner portions of the appliance. Due to the fact that the roasting or baking chamber is completely enclosed and due to the circulation and heat reflection described above, a saving in energy used during baking and roasting is achieved since the thermostat begins to operate shortly after the application of heating current to the heating element 18. More specifically, the inner lining 22 rapidly reaches the roasting or baking temperature and therefore opens the thermostat.

The circulation of air through chamber 56 which has been described above is also obtained during the baking and roasting operations. Accordingly the finish of surface 36 is protected from excessive temperatures and the outside of housing 24 is maintained at a relatively low temperature thereby preventing the possibility of the user receiving burns by contact therewith.

The manner in which the present invention is adapted for use with a grill plate for the direct frying of pancakes, hamburgers, and the like, is shown in Figure 7. A grill plate, generally designated by the numeral 140, is positioned directly over the lower heating element 18. As is best shown in Figure 8, grill plate 140 is substantially circular in shape and comprises a body 142, an upstanding circumferentially extending rim 144, a depending flange 146, which has a diameter slightly greater than the diameter of the heating element 18, and a plurality of ribs 148 radiating from a center piece 150 to the flange 146. The grease used in grilling is disposed on the body 142 and retained thereon by the rim 144. The ribs 148 serve to distribute the heat coming from heating element 18 throughout the surface of the grill plate 140. The outer periphery of the grill plate 140 is supported on the flange 50 of support plate 20 and is retained thereon by the flange 46 formed on the upper edge of housing 24. It will be seen that the grill plate 140 can be readily and easily placed in the grilling position and removed.

The dome 12, the heat spreader plate 16, the heating element support plate 20, the inner lining 22, and the external housing 24 may be made of any suitable heat conducting material having the requisite mechanical strength. A preferred material of fabrication is aluminum. The grill plate 140 is preferably cast from aluminum. It is to be understood, however, that other suitable materials and methods of fabrication may be used.

It will be seen that there has been provided a cooking appliance which fulfills all of the above objects and advantages. More specifically, there has been provided an appliance which is adapted to be readily and easily converted for use in various types of cooking operations. An improved base has been provided which protects the supporting surface from overheating and which prevents the user from being burned from contact therewith. An improved mounting for the thermostat unit is provided whereby a better control of the cooking temperature of the appliance is obtained. During roasting and baking circulation of the heating medium is obtained around all portions of the utensil containing the material to be roasted or baked whereby to achieve uniform and therefore better roasting and baking.

Although a preferred embodiment of the invention has been shown for purposes of illustration, it is to be understood that various changes and modifications can be made therein without departing from the scope and spirit of the invention. Accordingly the invention is to be limited only as set forth in the following claims.

This invention is hereby claimed as follows:

1. A cooking appliance comprising an external housing, an inner lining of heat conducting material mounted in said housing and spaced therefrom to form a chamber, a heating element support mounted on said housing and covering the upper end thereof, a heating element mounted on said support, a heat spreader plate mounted on said housing above said heating element and spaced from said heating element, and a dome mounted on said housing and covering said heat spreader plate, said support and plate having apertures formed therein whereby to provide circulation between the chamber formed between said inner lining and said support and the chamber formed by said support and said dome.

2. A cooking appliance comprising an external housing, said housing including a bottom and an upstanding wall formed around said bottom, the upper edge of said wall having an inwardly directed flange thereon, an inner sheet metal lining having an outwardly extending flange thereon, said inner lining being of a size adapted to fit within said external housing with the flange on said inner lining being supported by the flange on said housing wall, a support overlying said inner lining and supported on said flanges, said housing, inner lining, and support having aligned apertures formed therein, a bolt extending through said apertures and clampingly holding the associated parts in assembled relation, a heating element mounted on said support, said support having another aperture therein to provide for air circulation around said heating element and within said lining, and a thermostat mounted on said housing for controlling said heating element, the temperature responsive element of said thermostat being in thermal contact with said inner lining.

3. A cooking appliance comprising an external housing, said housing including a bottom and an upstanding wall formed around said bottom, the upper edge of said wall having an inwardly directed flange thereon, an inner sheet metal lining having an outwardly extending flange thereon, said inner lining being of a size adapted to fit within said external housing with the flange on said inner lining being supported by the flange on said housing wall, the bottom and walls of said housing being spaced from said inner lining to provide a chamber therebetween, the bottom and wall of said housing having apertures therein to provide circulation between said chambers, a support overlying said inner lining and supported on said flanges, said housing, inner lining, and support having aligned apertures formed therein, a bolt extending through said apertures and clampingly holding the associated parts in assembled relation, a heating element mounted on said support, said support having another aperture therein to provide for air circulation around said heating element and within said lining, and a thermostat mounted on said housing for controlling said heating element, the temperature responsive element of said thermostat being in thermal contact with said inner lining.

4. A cooking aparatus for use in various cooking operations, and comprising an external housing, an inner lining of relatively thin heat conducting material mounted within said housing and spaced inwardly therefrom to provide a first chamber between the lining and the housing, a heating element support mounted on said housing and covering the open end of the inner lining to provide a second chamber between the support and the inner lining, a heating element mounted on said support, a thermostat mounted on said housing for controlling said heating element and having the temperature responsive means thereof disposed substantially entirely within said first chamber and adjacent the outer surface of said inner lining, means providing direct thermal contact between said temperature responsive means and said inner lining, and a dome mounted on said housing and providing a third chamber between the dome and said heating element support, said support having an aperture therethrough providing for circulation between the second and third chambers whereby the thermostat is substantially responsive to the temperature in said third chamber, and said housing having apertures therethrough for circulation of cooling air through said first chamber for retarding heat responsive action of the thermostat.

5. A cooking apparatus as claimed in claim 4, wherein a heat spreader plate is disposed over said heating element support and is provided with aperture means therethrough to assist the circulation between the second and third chambers.

6. A cooking apparatus as claimed in claim 5, wherein the support and heat spreader plate are provided with peripherally disposed apertures adjacent the outer edges thereof.

7. A cooking apparatus as claimed in claim 4, wherein the apertures in said housing are arranged in upper and lower peripheral rows to facilitate circulation of cooling air.

References Cited in the file of this patent

UNITED STATES PATENTS

| Number | Name | Date |
|---|---|---|
| 1,029,230 | Russell | June 11, 1912 |
| 1,700,087 | Slade | Jan. 22, 1929 |
| 1,706,908 | Westman | Mar. 26, 1929 |
| 1,878,140 | Hicks | Sept. 20, 1932 |
| 2,007,876 | Sauvage | July 9, 1935 |
| 2,046,125 | Lacy | June 30, 1936 |
| 2,048,929 | Garman et al. | July 28, 1936 |
| 2,089,521 | Wolcott | Aug. 10, 1937 |
| 2,198,645 | Wolcott | Aug. 30, 1940 |
| 2,224,552 | Sickinger | Dec. 10, 1940 |
| 2,235,911 | Wilcox | Mar. 25, 1941 |
| 2,486,862 | Meyer | Nov. 1, 1949 |
| 2,496,654 | Alsdorf | Feb. 7, 1950 |

FOREIGN PATENTS

| Number | Country | Date |
|---|---|---|
| 330,569 | Germany | Dec. 17, 1920 |
| 479,907 | Great Britain | Feb. 11, 1938 |
| 543,731 | France | June 9, 1922 |